United States Patent Office 3,505,941
Patented Apr. 14, 1970

3,505,941
V-STOL DATA CAMERA
John F. McCormick and Louis H. Ormerod, Lancaster, Calif., assignors to the United States of America as represented by the Secretary of the Air Force
Filed Feb. 2, 1968, Ser. No. 702,613
Int. Cl. G03b 19/02
U.S. Cl. 95—36    11 Claims

ABSTRACT OF THE DISCLOSURE

A main tracking shaft member having a pair of horizontal and manually-operable, left and right-hand tracking shaft arm portions is affixed to a main support member that is rotatably and slidably positioned on the top of the enclosure of a V-STOL data camera to thereby permit tracking of a moving vehicle in a horizontal and lateral-traversing direction only, and without requiring any changes in the elevational attitude of the camera. A pair of tracking binoculars are positioned on the top surface of the main tracking shaft member and extend to a location convenient to the operator of the camera. A vertical shaft member is affixed to the bottom of the main support member and interconnects with the camera assembly by a horizontally-disposed, shutter assembly-operating arm member that is revolvably attached to the vertical shaft member. A retractable pawl device is rigidly attached to the vertical shaft member and normally engages with the shutter assembly-operating arm member to thereby transfer through the latter member any movement applied to the main tracking shaft member.

The shutter assembly includes a pair of shutter solenoids for operating the shutter and which are mechanically interconnected with a pair of electrical contacts that are in circuit with, and automatically control operation of, the camera film transport mechanism in timed response to the periodic operation of the shutter during the filming of a moving vehicle such as a V-STOL aircraft.

BACKGROUND OF THE INVENTION

This invention relates generally to the tracking-type camera and, in particular, to the tracking, photographing and the recording of the flight characteristics data of V-STOL aircraft by the V-STOL data camera.

Previously developed tracking cameras have frequently been operated by pointing the camera optical axis directly at the object being tracked, or, more particularly, as some designated target point on the tracked object. With this technique, both horizontal and elevational changes in the attitude of the camera were required and, as such the successive images of the objects exposed on the film incorporated apparent changes in both appearance and size, sometimes appearing lengthened over actual size and sometimes appearing foreshortened in size, depending on whether the object was approaching or moving away from the camera position. More recently developed cameras have attempted, with a certain degree of success, to overcome the above-noted disadvantages inherent in the tracking and photographing of objects during camera movement in several planes, by restricting the camera to movement in a horizontal plane only. In this regard, the camera of the present invention offers both the known advantages of exposing successive film frames over a relatively wide horizontal field in an improved manner but, in addition, is designed to incorporate improved film coverage in the vertical field as well. Moreover, the present invention incorporates a unique combination of features which, collectively, greatly facilitate both the tracking and the filming of moving objects by utilizing both improved shutter and film transport control that are automatically related to each other in an improved manner to be explained hereinafter in the following summary and detailed description.

SUMMARY OF THE INVENTION

The principal object of the present invention, therefore, resides in a new and unique V-STOL data camera arrangement in which improved means are utilized both for tracking and photographing moving objects in a horizontal plane only, and therefore, without requiring any changes in the elevational attitude of the camera.

A further object of the invention is a novel V-STOL data camera equipped with improved automatic control of the film transport mechanism, in unique combination with, and automatically operable by, an improved shutter assembly-operating and control means.

A still further object of the invention is in the utilization of a V-STOL data camera having an improved arrangement of a film transport mechanism that is operable to automatically move the film in timed sequence and in improved manner relative to the periodic operation of the shutter mechanism.

Another object of the invention is in a V-STOL data camera incorporating an improved camera lateral traverse mechanism in unique combination with a novel shutter assembly and operable either in conjunction with or independently thereof.

Other objects and advantages of the invention will become readily apparent from the following description, taken in connection with the accompanying drawings, in which:

DESCRIPTION OF THE PREFERRED EMBODIMENT

Figure 1:
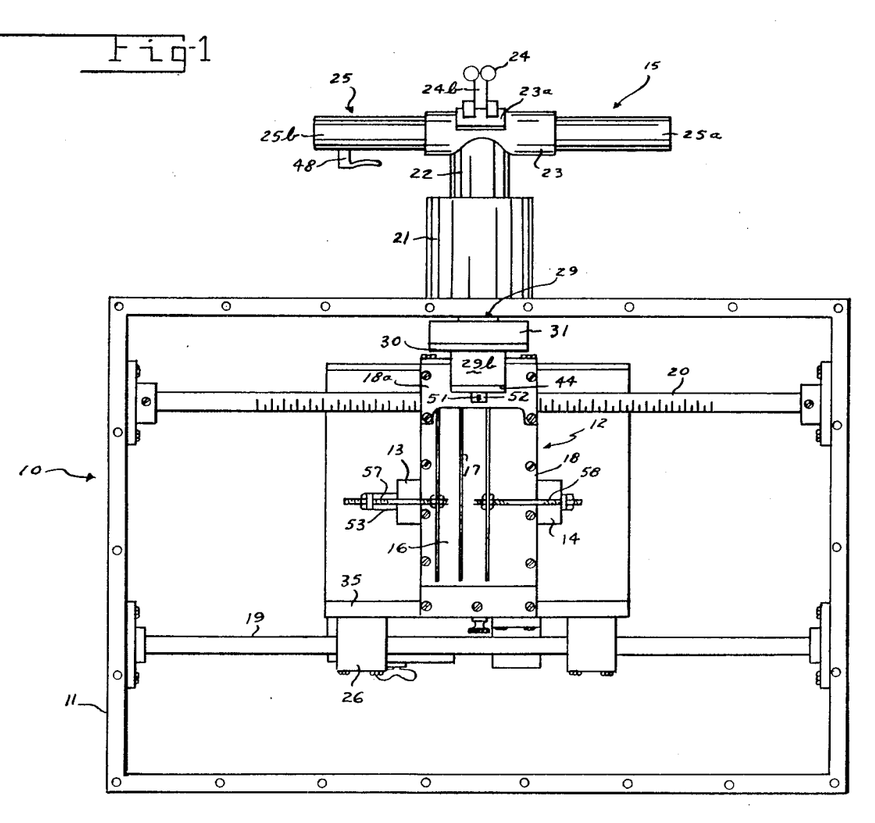
FIGURE 1 is a front assembly view of the V-STOL data camera of the present invention, with the front plate removed to illustrate certain details of the shutter assembly and lateral traverse mechanism.
Figure 2:
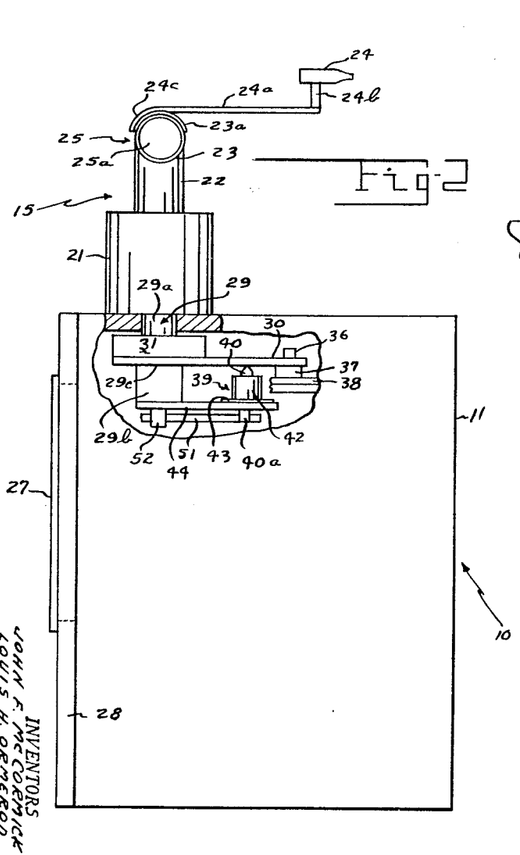
FIGURE 2 is a partly schematic and sectional, side elevational view of the camera of FIGURE 1, with a portion of the camera side plate shown broken-away to disclose additional details of the lateral traverse mechanism.

Referring generally to the drawing and, in particular, to FIGURES 1 and 2 thereof, the V-STOL data camera of the present invention is indicated generally at 10 as including, in part, a camera enclosure 11, a shutter assembly indicated generally at 12 and including a pair of shutter-operating solenoids indicated at 13 and 14, and a lateral traverse mechanism indicated generally at 15. Shutter assembly 12 further includes the shutter 16, which incorporates a shutter slit at 17 and a shutter assembly carriage or mount at 18 which further includes the shutter suspension portion at 18a that is adapted to specifically support the shutter for respective back-and-forth movement, or from right-to-left and vice versa as viewed in FIGURE 1 during operation of the present camera. Camera enclosure 11 also incorporates two each parallel lateral transport rods, the front one of which is shown at 19, which provide the necessary support for the upper and lower end portions of the shutter assembly 12 during the lateral traverse operation of the present camera. For this purpose, a plurality of bushings, one of which is illustarted by the reference numeral at 26 (FIGURE 1), are provided to slidably support the bottom end of the shutter assembly 12 on the lower transport rod 19, which bushings are affixed to the bottom-attached bracket 35. The upper end portion indicated by the previously-noted suspension means at 18a, of the aforesaid shutter assembly may be suitably slidably positioned on the upper one (not shown) of said lateral transport rods by means of a plurality of guide rollers, such as is indicated at 46 in FIGURE 5 of the drawings, which guide rollers 46 may be appropriately affixed to, and mounted for rotation relative to the top plate element (denoted by the shutter assembly suspension means 18a) of the said shutter assembly.

Also illustrated in FIGURE 1 is a film frame identification (I.D.) ribbon at 20, which is supported between the side walls of the camera enclosure 11 and is positioned to extend across and in front of each film frame to uniquely expose a total of 44 equally-spaced markings on the film frame during the exposure operation of the present camera. In this regard, the present invention incorporates the additional novel feature of being capable of filming a V-STOL aircraft in flight while tracking horizontally and in lateral traverse only and, accordingly, eliminates any need to change the attitude of the camera in elevation. For this purpose, a 6 inch focal length, wide angle lens (with 5¼ inch aerial recon film) is utilized. Said lens, which has been omitted in FIGURE 1 for the sake of clarity, is illustarted at 27 in FIGURE 2. It is mounted in the camera front plate 28 and, with the unique arrangement of the present camera, enables the photographing of vertically rising, sinking or hovering vehicles on a film frame whose dimensions are 0.200 inch wide by 5.000 inches high, which provides a vertical included angle of approximately 40° with the camera mounted at a fixed elevational attitude, as noted hereinbefore. Moreover, the specific shutter arrangement of the present camera is operable independently of the tracking, or lateral traverse operation, the frame rate exposure can be adjusted as desired, and furthermore, a horizontal traverse may be photographed with the inventive camera system with a 72° included angle.

Figure 3:
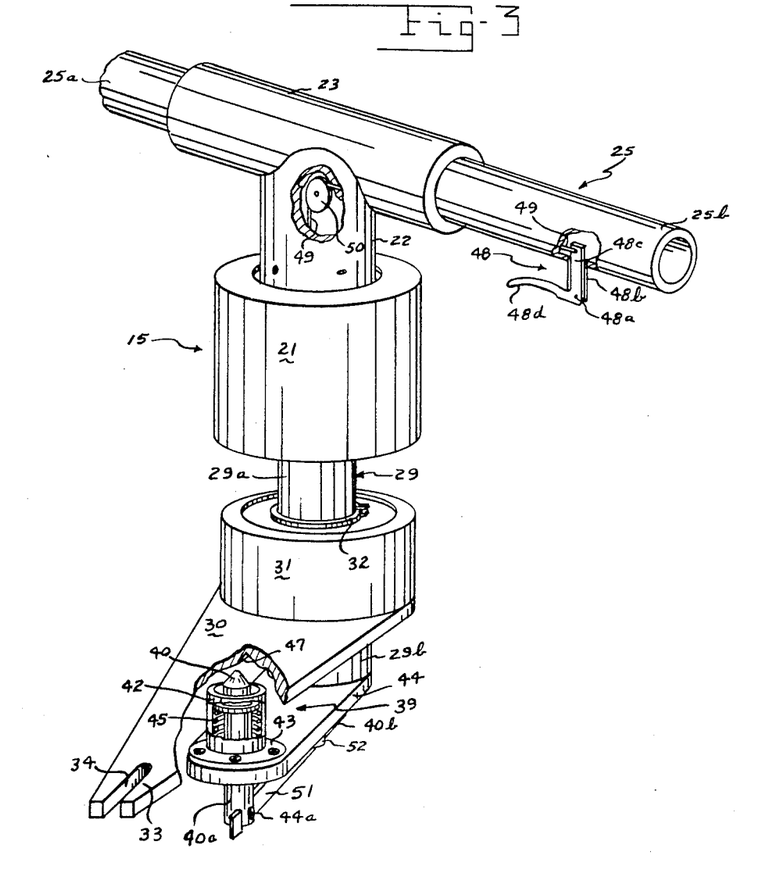
FIGURE 3 is an enlarged perspective view, generally illustrating still further details of the lateral traverse mechanism of the inventive camera of FIGURES 1 and 2 and, in particular, showing the traverse pawl in its retracted, nonoperative position.

The previously noted lateral traverse mechanism 15 is illustrated in FIGURES 1–3, inclusive, as partly including a relatively enlarged main support member 21 vertically-disposed in upward, rotatable and slidable-supporting relation on the top surface of the camera enclosure 11. A relatively reduced-size tracking arm support or upper shaft-type member 22 is integrally formed on said main support member 21 and extends further upwardly in a vertical direction to terminate in an upper end portion adapted to provide the necessary support for a horizontally-disposed, cylindrical and relatively short, supporting hollow sleeve member 23. Affixed within said supporting sleeve member 23 is a relatively elongated and similarly horizontally-disposed, main shaft-type tracking arm member 25, which arm member 25 extends outwardly an equal distance from the opposite ends of said sleeve member 23 to thereby form left and right-hand, manually-operable tracking arm portions, indicated respectively at 25a and 25b.

The aforesaid supporting sleeve member 23 also provides support for a pair of tracking binoculars at 24 by means of an arcuate shaped, intermediate support member at 23a that is adapted to conform with and is affixed to the upper surface of said sleeve member 23, a relatively elongated and horizontally-disposed, main tracking binocular arm-supporting member shown at 24a extending rearwardly to a convenient location for the camera operator, and an upright, vertical support means at 24b which provides the immediate support for said tracking binoculars 24. The relatively elongated horizontally-disposed member 24a also terminates in an arcuate-shaped end portion at 24c which likewise conforms with, and is affixed to the top portion of the support member 23a.

Rigidly affixed to the bottom surface of the main support member 21 (FIGURES 1–3) and therefore rotatable and slidable therewith is an interconnecting shaft-type member at 29. The latter member 29 is vertically-oriented and extends downwardly through the top surface of the camera enclosure 11 and may be formed with an upper relatively reduced diameter shaft portion at 29a immediately adjacent to the main support member 21 and a lower, relatively enlarged diameter shaft portion at 29b forming an abutting surface at 29c with said upper shaft portion 29a. Pivotally or revolvably mounted on upper shaft portion 29a is the relatively elongated, shutter-assembly, interconnecting operating arm member 30 which, when actuated, effects an appropriate movement of the shutter-assembly 12. Operating arm member 30 may be held to the shaft member 29 around the said upper shaft portion 29a and in abutting contact with surface 29c by means of a circular, collar-type support member indicated at 31, with the arm member 30 being integrally formed in depending relation to the bottom surface of the support member 31 and extending outwardly from, and at a right angle to the axis thereof. A clamp member at 32 (note FIGURE 3) may be used to retain collar-type member 31 and thus arm operating member 30 in its correctly-oriented position as shown.

The aforesaid interconnecting operating arm member 30 tapers to a relatively narrow outer end portion at 33 (note FIGURE 3) that incorporates an open end slot at 34, which slot 34 engages with an upright pivot member indicated at 36 in FIGURE 2. Upright pivot member 36 extends vertically upwardly from an intermediate support surface at 37 which is formed on the top plate member 38 of the shutter suspension means 18a, and appropriately supports the outer end portion 33 of the arm member 30.

The lateral traverse mechanism 15 further includes a novel lateral traverse pawl mechanism indicated generally at 39. The pawl mechanism 39 includes a lateral traverse pawl member at 40 which may consist of a relatively elongated rod-type member, and an upright cylindrical pawl support at 42, which supports the pawl member 40, by means of the integral flange portion 43 (FIGURE 3), to the outer end of a relatively elongated, pawl-supporting arm member 44 that is rigidly positioned on the bottom surface of the previously described lower shaft portion 29b of the vertical shaft member 29. A pawl spring at 45, which is contained within the cylindrical pawl support 42, normally is operative to urge the pawl member 40 in a vertically upward direction to an engaged, operable position within a slot 47 (note FIGURE 3) formed in the lower surface of the shutter-assembly, interconnecting operating arm member 30, as is seen particularly in the view of FIGURE 3. In this manner, any manual movement applied to the manually-operable, left and right-hand tracking arm portions 25a, 25b will be transferred from the previously-described lateral traverse mechanism to the arm member 30 by way of the pawl mechanism 39 to thereby control movement of the shutter assembly 12. However, in initially aligning the present camera on a moving target to be tracked and filmed, the operator may manually withdraw the pawl member 40 from its upper, engaged position in the slot 47 and retain the same in a lower, disengaged position until the camera is correctly aligned on target and accurate tracking has begun, at which time the pawl member 40 may be quickly reengaged in the slot 47 to thereby begin lateral traversing operation of the shutter assembly 12 through means of the shutter assembly, operating arm member 30 interconnected therewith. Of course, during this idle tracking period, when the filming operation has not yet begun, arm member 30 remains inactive until the aforesaid reengagement with pawl member 40.

To accomplish the above described operation of the pawl member 40, one of the tracking arm portions, as for example, the right-hand tracking arm portion 25a, may be equipped with a traverse pawl-retract trigger device, such as that shown in schematic form at 48 in FIGURES 1 and 3. As seen particularly in FIGURE 3, the trigger device 48 includes a vertically-oriented trigger portion at 48c that extends from an upper position from within or inside the arm portion 25b to a pivot point at 48a positioned outside and below the arm portion 25b, and a substantially horizontally-disposed trigger portion at 48d which portion 48d is the actual part of the trigger device 48 that is manually operated. A bracket at 48b, formed in depending relation to arm portion 25b, is used to provide an appropriate rigid support for the pivot point 48a. The trigger device 48 is operated by manually depressing the trigger portion 48d thereof in an upward direction, causing it to pivot about the pivot point 48a, in a clockwise direction, to thereby move the vertically-oriented, trigger portion 48c thereof in a direction from left to right (as viewed in FIGURE 3). This latter movement, in turn, actuates or operates and operating cable indicated at 49, the upper end of which being shown attached to the trigger portion 48c within arm portion 25b. The cable 49 is led from the aforesaid point of attachment at its upper end to the trigger portion 48c in a substantially horizontal direction to engage with a pulley, indicated at 50, which pulley is adaptable to be mounted in fixed relation in any suitable manner at an appropriate position within the arm support member 22. From this pulley position, the cable 49 is then directed in a substantially vertical, downward direction to terminate in a lower cable end that is adapted for rigid connection to a relatively elongated, pawl member-retract arm indicated at 51, which arm 51 is fitted at one end thereof within a bifurcated, lower end portion 40a of the pawl member 40 that extends through, and vertically below the pawl-supporting arm member 44. Said arm 51 is further pivotally attached within said bifurcated, lower end portion 40a by means of the pivot at 44a and it is also pivoted to the pivot at 52 which pivot 52 is affixed to the underside of said pawl-supporting arm member 44. The attachment of the lower end of cable 49 to the aforesaid arm member 44, which may be accomplished by any suitable fastener means, the specific details of which are unimportant to the present invention, is of course at, or near the end of the arm member 44 that is remote from the pawl member 40 and is, therefore, on the opposite side of the pivot 52, or, in other words, at the area thereof indicated generally by the reference numeral 40b in FIGURE 3. In this manner, manual operation of the cable 49, by means of the trigger device 48, causes the right-hand end of the pawl-supporting arm member 44, as viewed in FIGURE 3, or left-hand end as seen in FIGURE 2, to rotate about the pivot 52 in an upward direction. The opposite end of the member 44, which has been previously described as being pivoted at 44a to the lower end of pawl member 40, is thereby simultaneously rotated in a downward direction and naturally pulls the pawl member 40 pivoted thereto downwardly against the action of pawl spring 45 to disengage its upper end from the slot 47 in the shutter-assembly operating arm member 30 to thereby allow the previously-noted idle tracking period until the operator has accurately aligned the camera on target.

With the foregoing arrangement, the operator may quickly begin the filming operation of the present camera after accurate tracking alone has been achieved, by releasing the trigger device 48 and thereby permitting the pawl spring 45 to again normally act to urge the pawl member 40 upwardly to its engaged position within the slot 47 of the shutter assembly-operating arm member 30. The operator may thereafter begin the photographing of the moving vehicle, such as a V–STOL aircraft by commencing operation of the camera shutter 16. The unique operation of the aforesaid shutter and its novel means of automatically controlling the film transport mechanism will now be described in detail hereinafter.

Figure 4:
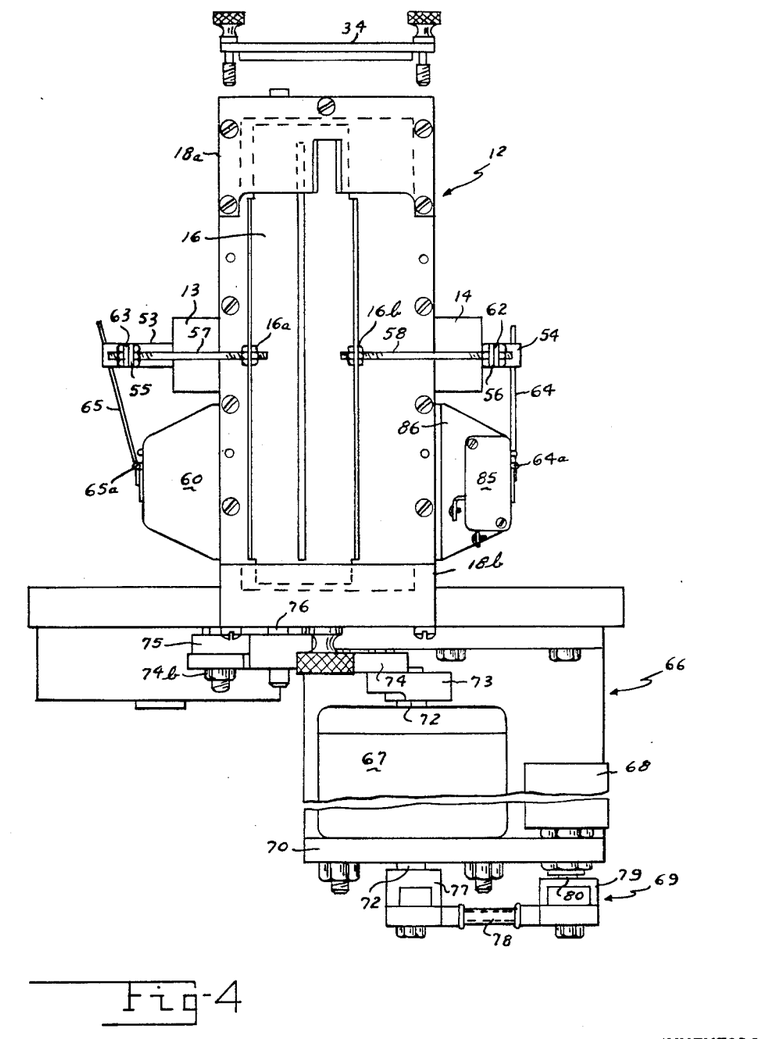
FIGURE 4 is another enlarged view, in front elevation, generally showing further details of the shutter assembly used with the inventive camera of FIGURES 1 and 2, and in particular, illustrating certain details of the mechanically-actuated electrical contacts used to energize the film transport mechanism.
Figure 5:
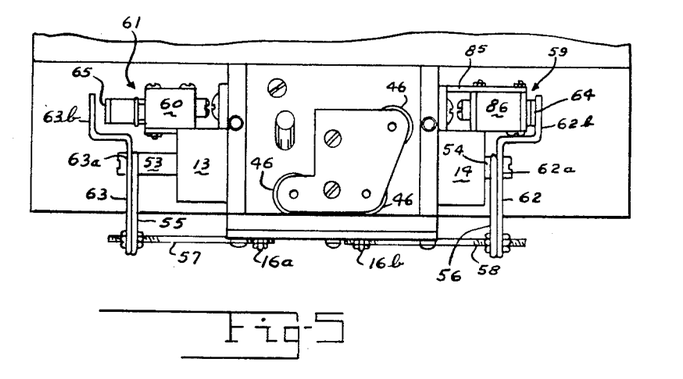
FIGURE 5 is a top end view of the shutter assembly of FIGURE 4, illustrating additional details of the mechanically-activated contacts, and in addition, showing certain details of the shutter suspension means used with the inventive camera.

Referring specifically to FIGURES 4 and 5 of the drawings, the shutter assembly 12 is again shown as including the shutter 16 and the shutter suspension means at 18a. Shutter 16 may be a thin steel, or Phosphor bronze plate which is adaptable to slide to the right and left in clearance slots (not shown) that may be machined in the shutter suspension means 18a illustrated at the top of the shutter assembly 12 and in the lower shutter suspension 18b (note FIGURE 4). The previously noted shutter solenoids are illustrated at 13 and 14. The present camera shutter action utilizes the two shutter-solenoids 13, 14 to operate in push-pull manner and thus alternately slidably actuate the shutter 16 respectively to its left and right positions within the shutter suspension means 18a and 18b. To this end, the aforesaid shutter solenoids 13 and 14 respectively include main solenoid core members 53 and 54, which are each interconnected to opposite sides of the shutter 16 at the points 16a and 16b (FIGURE 1) by means of a pair of interconnecting elements which include the intermediate, motion-transferring cross-piece elements indicated at 55 and 56, respectively, and the main solenoid-actuated, and shutter-operating arm members at 57 and 58. The first-named members 55 and 56 are respectively attached at one end thereof to the outer ends of the aforesaid core members 53 and 54, while the opposite ends of members 55, 56 are adjustably positioned to the outer ends of the last-named interconnecting members 57, 58 which, in turn, are adjustably positioned to opposite sides of the shutter 16 as indicated. Thus, actuation of the right shutter solenoid 14, for example, causes the corresponding solenoid core member 54 to move into the core of the solenoid 14, or, in other words, to the left as seen in the aforesaid FIGURES 4 and 5. This latter operation also moves the shutter 16 to the left because of the previously described interconnecting members 56 and 58. The left shutter solenoid 13 operates in an identical manner during the reverse operation of the shutter 16 to the right as appears obvious from the drawings and, accordingly, will not be explained in further detail.

The above-described operation of the shutter 16 naturally moves the shutter slit 17 (note FIGURE 1) initially to its film exposure position and subsequently again to its film non-exposure position just prior to the completion of its movement to the left. In addition, this movement of the shutter 16 accomplishes one of the key features of the present invention; namely, automatic operation of the film transport mechanism in an improved manner as will be described hereinafter. For the latter purpose, the shutter 16 supports a set of mechanically activated electrical micro-switch contacts which are located at each end thereof. The micro-switch contact on the right side of the shutter 16 is contained within a switch housing indicated at 85 in FIGURE 4 and which is held to the shutter by means of the micro-switch bracket at 58. In FIGURE 5, the micro-switch contacts contained within the housing 85 are shown in their closed position at 59. The corresponding set of micro-switch contacts supported on the left side of the shutter 16, as by means of the bracket at 60 (FIGURE 4), are depicted generally at 61 in their open position in FIGURE 5. A micro-switch operating lever is positioned respectively at 62 and 63 for each of the right and left-side set of micro-switch, contacts 59 and 61 and each is attached at one end thereof to a respective shutter main solenoid core member 53, 54. From their respective points of attachment to the shutter-operating arm members 55 and 56, each of said micro-switch operating levers, 62, 63 incorporates a portion that is formed in parallel and contacting relation to the intermediate, motion-transferring cross-piece elements 55 and 56 and extends initially to an attached position to the shutter core members 53 and 54, as shown respectively at 62a and 63a. From the latter positions of attachment, said operating levers 62, 63 extends outwardly and then upwardly (as seen in FIGURE 5) to terminate in a straight micro-switch contact engaging portion, respectively indicated at 62b and 63b that is positioned in substantially adjacent and overlapping relation to the aforesaid micro-switch contacts 59 and 61. In this regard, both intermediate, cross-piece elements 55 and 56 and the micro-switch contact operating levers 62, 63 are adjustably mounted on the shutter-operating arm members 57 and 58, as shown, in order that they may be positioned in correct, operating relation to each other and to the micro-switches 59 and 61 to enable the accurrate and periodic movement of the shutter 16 in correctly timed sequence to the operation of the film transport mechanism. Thus, as the shutter 16 is moved, for example, to the left, by means of the right shutter solenoid 14, the micro-switch operating lever 62 (see FIGURE 5) also moves to the left simultaneously with movement of the shutter 16 by the shutter-operating arm member 56 to thereby effect contact between the portion 62b thereof and a main micro-switch contact-operating member 64 and force the latter to its micro-switch contact closing position, as seen in the aforesaid FIGURES 4 and 5. A similar, contact-operating member is provided at 65 for actuation to its micro-switch contact-closing position during the alternate operation of the left shutter solenoid 13. The members 64 and 65 are respectively pivoted at 64a and 65a to their respective switch housings, one of which being shown at 85 in FIGURE 4, in adjacent relation to, and thereby effect alternate operation of the aforesaid micro-switches 59 and 61 during the above-noted periodic operation of the shutter 16.

Figure 6:
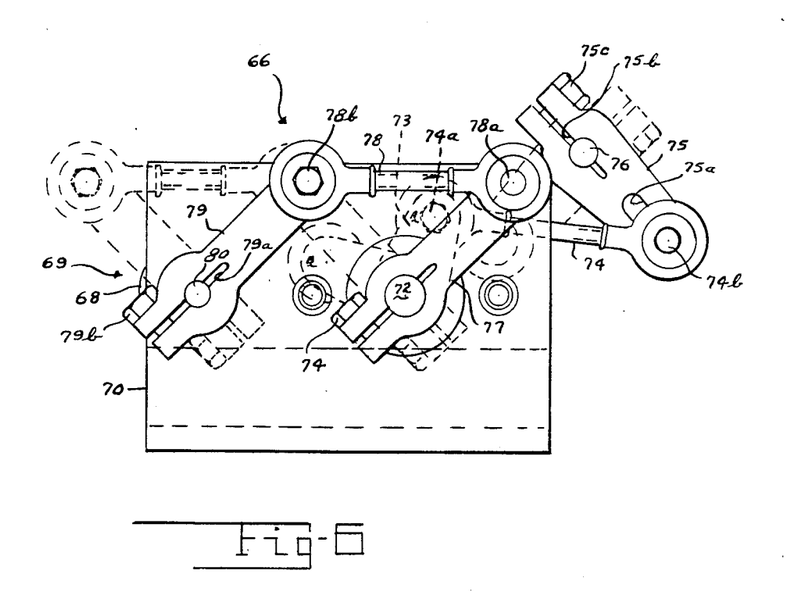
FIGURES 6 and 7 respectively represent bottom, and rear end views, illustrating details of the film transport solenoid and rotary switch mechanism used with the present camera.
Figure 7:
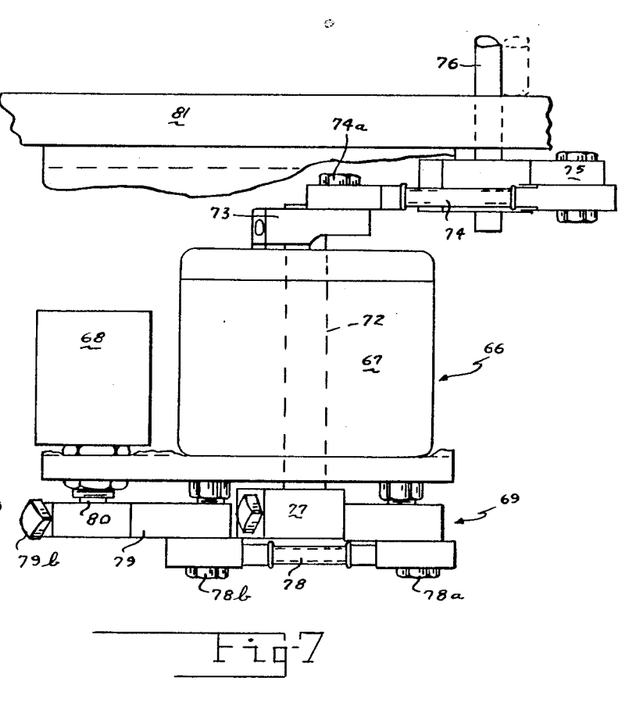
Figure 8:
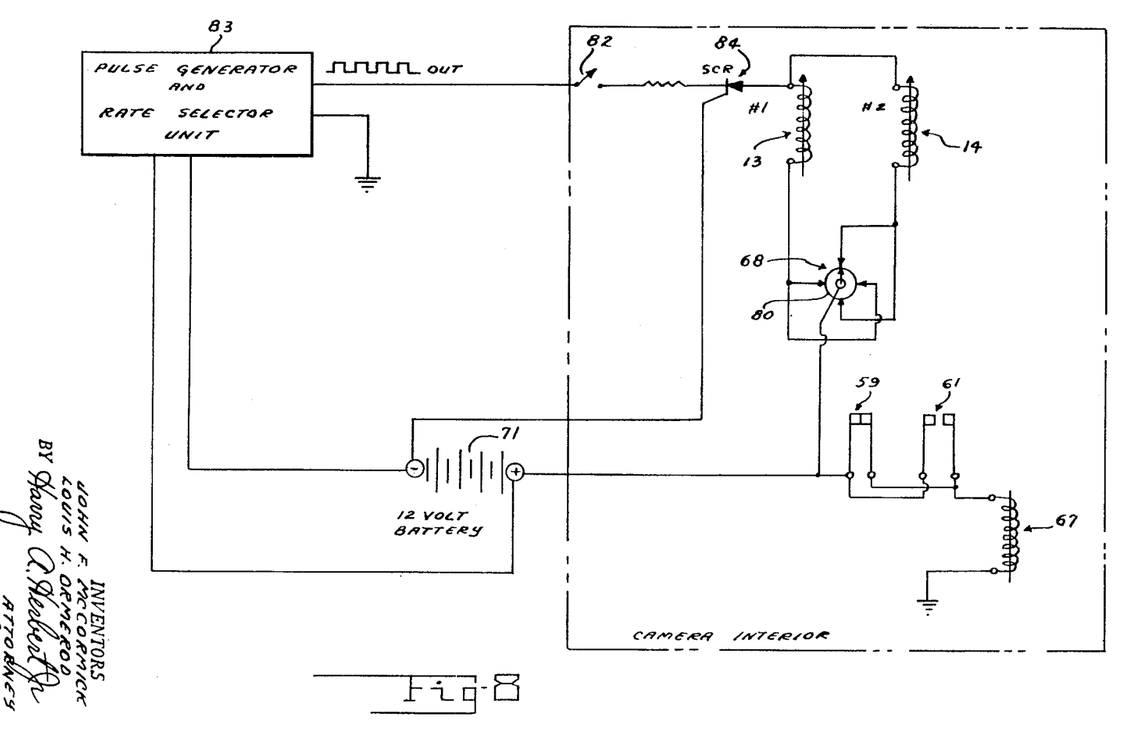
FIGURE 8 is a schematic view of an electrical circuit adapted for use with the present camera and illustrating the electrical interconnection between the mechanically-activated contacts of FIGURES 4 and 5, and the rotary switch mechanism of FIGURES 6 and 7 and the shutter solenoids.

The film transport assembly to be automatically controlled by the periodic operation of either shutter solenoid 13, 14 is shown generally at 66 in FIGURES 4, 6 and 7. Said film transport assembly generally includes the film transport solenoid mechanism at 67, the rotary switch mechanism indicated at 68, which is operative to deenergize the electric circuit (note FIGURE 8) to the shutter solenoids 13 and 14, and the novel mechanical coupling of the present invention, indicated generally at 69, which interconnects the film transport solenoid mechanism 67 and the rotary switch mechanism 68 in an improved manner. The aforesaid film transport solenoid mechanism 67 is activated, as indicated hereinbefore, by completion of the operation of the shutter 16 in either direction. Just prior to the completion of the movement of the shutter 16 right to left, or left to right, to effect closing of the micro-switch contacts at 59 or 61, as has been previously described, an electrical circuit such as that depicted in FIGURE 8 is closed and twelve volts D.C. supplied by the battery at 71 is circuited through the set of contacts at 59 or 61 to the film transport solenoid 67 which, in turn, operates the rotary switch mechanism 68 (note FIGURES 6 and 7) by means of the previously mentioned mechanical coupling mechanism 69. This latter operation of the film transport cam through means of mechanical rotor of the said switch mechanism 68 forms an etxension of the film transport cam through means of mechanical linkages operably connected therebetween, as will become readily apparent from the more detailed description hereinafter.

The aforesaid film transport solenoid mechanism 67 includes a film transport solenoid core member at 72 (note FIGURES 4, 6 and 7) which core member 72 is rotatable within its solenoid on energization of the latter mechanism by the previously described closing of the electrical contacts 59 or 61, as a result of the operation of the shutter 16 by either shutter solenoid 13 or 14. The aforesaid transport solenoid core member 72 is elongated a sufficient amount to extend outwardly of both ends of the transport solenoid mechanism 67 and thereby provides a support means for certain elements of the mechanical coupling 69, which will be described hereinafter in detail.

The aforesaid mechanical coupling 69 includes, in part, a film transport actuating arm 73, which arm 73 is fixedly positioned on one end of the film transport solenoid core member 72, as shown in FIGURES 4, 6 and 7. Arm 73 is shown in dotted lines in the bottom view of FIGURE 6 in two position; namely, position A which represents the exposure position thereof, and position B which represents the film transport position thereof. A film transport interconnecting link member 74 is pivoted at one end to said film transport actuating arm 73, at the pivot point 74a, and at its other end it is slidably pivoted within a relatively enlarged slot 75a formed within one end of a film transport cam-operating member 75. For this purpose, link member 74 is equipped with a pivot at 74b which is slidably engaged in slot 75a.

The above noted film transport cam-operating member 75 also incorporates a slotted end having a relatively elongated slot at 75b which terminates in a narrowed down flat open end portion adapted to mount the adjustment bolt at 75c. An enlarged opening is formed with the slot 75b at an intermediate location to accommodate one end of the film transport cam indicated by the reference numeral at 76. With use of the slot 75b and the adjustment bolt 75c, the film transport cam 76 may be easily and quickly adjusted to its correct operating position. In this regard, the solid line position of the aforesaid film transport cam represents its exposure position, whereas the dotted line position thereof represents its film advance position.

With particular reference to FIGURE 6, the mechanical linkage connection operably connected between the film transport solenoid mechanism 67 and the rotary switch mechanism 68 is illustrated as including, in part, a rotary switch actuating arm at 77 which is attached to the film transport solenoid core member 72 at the end thereof opposite of the film transport actuating arm 73, Said rotary switch actuating arm 77 is, in turn, pivoted at the pivot point 78a, to one end of a rotary switch interconnecting link member 78, the other of which is pivotally attached, at the pivot 78b, to the outer end of a rotary switch-operating member 79. The latter member 79 incorporates, at its end remote from its pivot to the rotary switch interconnecting link member 78, a relatively elongated slot at 79a, which slot 79a terminates in a narrowed down, flat open end portion adapted to mount and appropriately support the adjustment bolt at 79b. An enlarged opening is formed at an intermediate location with the slot 79b to accommodate one end of the rotary switch rotor member indicated by the reference numeral 80, which rotor member 80 is used as illustrated in the electric circuit of FIGURE 8 to deenergize the shutter solenoids 13, 14. The film exposure positions of the transport solenoid mechanism-actuating arm 73 and associated structure, and the rotary switch actuating arm 77 and associated structure is shown in solid lines, while the film advance position thereof is shown in dotted lines.

With the above-described mechanical coupling 69, at the completion of a shutter action by one or the other of the shutter solenoids 13, 14, twelve volts D.C., derived from the battery 71 (FIGURE 8) is circuited through one or the other sets of the contacts 59 or 61, which have been mechanically activated, as described hereinbefore, to the film transport solenoid mechanism 67. In the example shown in FIGURE 8, contacts 59 are illustrated as being in their closed position. Energization of the film transport solenoid mechanism 67, in turn, operates the film transport solenoid core member 72 (note FIGURE 6, for example). This movement in rotation of the core member 72 simultaneously pivots the film transport actuating arm 73 and interconnecting link member 74 to their dotted line film transport positions, as depicted in FIGURE 6. This latter movement also moves the film transport cam-operating member 75 which, in turn, rotates the film transport cam 76 through 90° to the latter's film advance position (likewise shown in dotted lines in FIGURE 7) to thereby advance the film illustrated in broken away form at 81.

The foregoing movement of the film transport mechanism 67 also automatically operates the rotary switch mechanism 68, since movement of the film transport solenoid core member 72 also effects simultaneous movement of the rotary switch actuating arm 77 fixedly mounted on the opposite end thereof. This latter movement of the actuating arm 77 correspondingly pivots the rotary switch operating member 79 through means of the rotary switch interconnecting link member 78 attached therebetween. Finally, this pivoting movement of the operating member 79 effects a simultaneous rotational movement of 90° of the rotary switch rotor member 80 to its switch open position to thereby deenergize both of the shutter solenoids 13, 14.

The previously described adjustable pivots provided through the release and adjustment of bolts 74 and 79b, for example, enable the relative positions between the various interconnecting links, such as at 74 and 78 and actuating members such as at 73 and 77 of the present invention to be finely adjusted to thereby ensure that the respective mechanically-activated contacts 59, 61 meet just before the end of a shutter stroke, thus providing direct current (D.C.) to the film transport solenoid mechanism 67, and are broken at the very end of the stroke. Moreover, one half of each set of contacts 59, 61 may be designed to allow a small adjustment so that a properly timed and stable circuit is obtained. After the shutter solenoids 13, 14 have been deenergized in the manner hereinbefore described, one camera cycle is then completed. The next cycle cannot be started until the switch at 82 (FIGURE 8) is closed and a pulse is thereby received from the generator at 83, at the SCR position indicated at the reference numeral 84 to thereby energize one of the shutter solenoids 13, 14. Thus, a camera cycle may be described as consisting of the energizing of a shutter solenoid, followed by the shutter action, next the shutter solenoid deenergization, and lastly, the completion of the film transport operation.

Although the present invention has been described with reference to a preferred embodiment, this is to be regarded as illustrative only and, therefore, it is to be understood that the invention is susceptible of variations, modifications and changes within the scope of the appended claims.

We claim:

1. In a V-STOL data camera equipped with aerial reconnaissance film and a wide angle lens and adapted to photograph vertically rising, sinking and hovering vehicles, such as V-STOL aircraft; a main camera enclosure; shutter-suspension means adaptable to be pivotally and slidably supported to said enclosure; a shutter slidably mounted within said shutter-suspension means for back-and-forth movement between film-exposure and film-advance positions; first, electromechanically-controlled, shutter-operating means interconnected between said shutter and a first power source and adapted to be periodically energized by said power source to thereby selectively operate said shutter between said film-exposure and film-advance positions alternately in either direction; a film transport mechanism having film-engaging means movable between film-exposure and film-advance positions; second, electromechanically controlled, film transport mechanism-operating means interconnected between said film transport mechanism and a second power source; said shutter further having mechanically-actuated means interconnected therewith and automatically and selectively engaged in operable relation to said film transport mechanism-operating means, when said shutter is moved through its film-exposure position and just prior to the completion of one camera cycle of operation, to thereby effect energization of said last-named, operating means by said second power source and thereafter move said film-engaging means to its film-advance position in timed sequence to the shutter-exposure operation; and switch means in circuit between said first and second electromechanically-controlled, shutter, and film transport mechanism-operating means, said switch means being normally adapted to be moved to one or more operative positions of adjustment and thereby selectively energize said shutter-operating means for movement thereof in either direction in its periodic back-and-forth movement between film-exposure and film-advance positions, said film transport mechanism being further interconnected with said switch means to automatically move said switch means to an inoperative position in timed response to the movement of the film-engaging means to its film-advance position, the movement of said switch means to its inoperative position thereby acting to deenergize said first, electromechanically-controlled, operating means for said shutter and thus completing one camera cycle and terminating further operation until said shutter is again operated by the further activation of said first power source.

2. In a V-STOL data camera as in claim 1, wherein said first, electromechanically-controlled, shutter-operating means comprises at least one solenoid device having a core member controllable thereby and movable between a first, inoperative position and a second, operative position on energization of said operating means by said first power source, said shutter being movable between its film-exposure and film-advance position by said solenoid device core member on the latter's movement to its operative position after the energization of said shutter solenoid device by said first power source.

3. In a V-STOL data camera as in claim 1, wherein said first electromechanically-controlled, shutter-operating means comprises a pair of shutter solenoids oppositely positioned relative to said shutter and each incorporating a solenoid core member positioned for relative movement therewith between a shutter, non-operating position and a shutter-operating position, each of said shutter solenoids further being operably engaged with an adjustable arm member indirectly attached at one end thereof to a respective core member and directly and adjustably attached at its other end to a respective side of said shutter, said arm members being adapted to alternately operate said shutter between its film-exposure and film-advance positions when said shutter solenoids are respectively and alternately energized from said first power source.

4. In a V-STOL data camera as in claim 1, wherein said second, electromechanically-controlled, film transport mechanism-operating means comprises a film transport solenoid having a transport core member movable between film-exposure and film-advance positions; film-engaging means adapted to contact with, and effect transport of, the camera film in alternate manner with the film exposure operation and first mechanical link means interconnected between said film-engaging means and adapted to move said last-named means to its film-advance position on activation of said film transport solenoid by said second power source.

5. In a V-STOL data camera as in claim 4, and second mechanical link means interconnected between the opposite end of said transport solenoid core member and said switch means, and simultaneously operative with said film transport mechanism to thereby move said switch means to its inoperative position to deenergize the first, electromechanically-controlled, shutter-operating means until again activated from said first power source.

6. In a V-STOL data camera as in claim 1, wherein said first electromechanically-controlled, shutter-operating means comprises a shutter solenoid; a shutter-operating, solenoid core member adapted to be moved between shutter-inoperative and shutter-operative positions; and a pair of shutter-operating and control members interconnected with each other and between said shutter solenoid core member and said shutter for moving said shutter between said film-exposure and film-advance positions when said interconnecting members are operated by movement of said shutter solenoid core member to its shutter-operative position after its actuation by the energization of said shutter solenoid from said first power source.

7. In a V-STOL data camera as in claim 6, wherein said shutter is incorporated in a shutter assembly supporting at least one set of microswitches in circuit with said second electromechanically-controlled, film transport mechanism-operating means, said assembly further supporting a microswitch actuating lever device operatively connected between said shutter-operating means at one end thereof and said shutter assembly at the other end thereof at a position substantially adjacent to said set of microswitches, said actuating lever thereby being adapted to be moved by operation of said shutter-operating means from a normally inoperative position to an operative position in engaging with, and closing said microswitches through contact therewith by its end adjacent to said microswitches to thereby energize and activate the film transport mechanism from said second power source.

8. In a V-STOL data camera as in claim 1, said camera enclosure slidably and pivotally supporting a combined horizontal tracking and lateral traversing mechanism, comprising; a first, main support member positioned in slidable and pivotally-adjustable relation to said camera enclosure; a second, tracking arm-support member fixedly positioned on said main support member; and a third, tracking binocular arm-support member rigidly attached to, and movable in horizontal tracking and lateral traverse with, said second, tracking arm-support member and further mounting a pair of tracking binoculars in upright position thereto.

9. In a V-STOL data camera as in claim 8, wherein said third, tracking binocular arm-support member incorporates an integrally-formed pair of left and right-hand, tracking arm portions manually operable for movement in horizontal tracking and lateral traverse; and said shutter is positioned in a shutter assembly further mounted for relative movement in a shutter-suspension means interconnected with said first, main support member, the latter thereby being adapted for manual operation to various positions of adjustment by the corresponding movement of said tracking arm portions; said first main support member having a first, main shutter-suspension means operating element positioned thereon for selective movement therewith and extending therefrom to, and in interconnecting relation with, said shutter-suspension means, and said shutter-suspension means being slidably and pivotally mounted relative to said camera enclosure and further having a second, auxiliary operating pivot element integrally formed thereto and engageable in operable relation with said first, main shutter-suspension means operating element for simultaneous movement thereby of said shutter ssupension means on manual operation of said tracking arm portions in either direction.

10. In a V-STOL data camera as in claim 9, wherein said first, main shutter-suspension means operating element is positioned for independent, relative movement on said first, main support member and further incorporates a slotted end portion adapted for adjustable engagement with said second, auxiliary operating pivot element, said first, main support member further incorporating a pawl-support member in rigid relation to and for simultaneous movement therewith, said pawl-support member supporting a pawl member normally spring-urged to an engaged, operating position with said first, main shutter suspension means-operating element for the simultaneous adadjustment thereof in both pivot and lateral traverse on manual operation of said tracking arm portions.

11. In a V-STOL data camera as in claim 10, wherein said third, tracking binocular arm-support member incorporates a retractable trigger device manually operable between inoperative and operative positions and having a cable attached at one end thereof to, and for movement with said trigger device, with said cable being further adaptable at its other end to be attached to said pawl-support member and thereby operable on movement of said trigger device to its operative position to move said pawl member in a direction opposite from its normal, spring-urged direction to effect disengagement between said pawl member and said first, main shutter-suspension means-operating element and thus ensure independent movement of said third, tracking binocular arm-support member and the binoculars supported thereto until accurate tracking has been obtained.

References Cited

UNITED STATES PATENTS 2,941,459   6/1960   Fairbanks.
3,392,648   7/1968   Bartholomew ______ 95—36 XR

FOREIGN PATENTS 150,235   3/1961   U.S.S.R.

NORTON ANSHER, Primary Examiner
L. H. McCORMICK, Jr., Assistant Examiner

U.S. Cl. X.R.
250—203